(12) United States Patent
Mackenzie (10) Patent No.: US 9,430,910 B2
(45) Date of Patent: Aug. 30, 2016

(54) LOTTERY SYSTEM AND METHODS THEREOF

(76) Inventor: Ndonye Mackenzie, Nairobi (KE)

( * ) Notice: Subject to any disclaimer, the term of this patent is extended or adjusted under 35 U.S.C. 154(b) by 518 days.

(21) Appl. No.: 13/989,390

(22) PCT Filed: Nov. 30, 2011

(86) PCT No.: PCT/KE2011/000027
§ 371 (c)(1),
(2), (4) Date: May 23, 2013

(87) PCT Pub. No.: WO2012/074140
PCT Pub. Date: Jun. 7, 2012

(65) Prior Publication Data
US 2013/0252695 A1    Sep. 26, 2013

(30) Foreign Application Priority Data

Nov. 30, 2010   (KE) .................................... 10/01193
Oct. 24, 2011   (KE) .................................... 11/01428

(51) Int. Cl.
*G07F 17/32* (2006.01)
*G07C 15/00* (2006.01)
*G06Q 30/02* (2012.01)

(52) U.S. Cl.
CPC ............. *G07F 17/329* (2013.01); *G07C 15/00* (2013.01); *G07F 17/3244* (2013.01); *G06Q 30/02* (2013.01); *G06Q 30/0212* (2013.01); *G06Q 30/0226* (2013.01)

(58) Field of Classification Search
CPC . G07F 17/329; G07F 17/3244; G06Q 30/02; G06Q 30/0226; G06Q 30/0212
See application file for complete search history.

(56) References Cited

U.S. PATENT DOCUMENTS

| | | | |
|---|---|---|---|
| 2002/0116266 A1* | 8/2002 | Marshall | 705/14 |
| 2003/0009375 A1* | 1/2003 | Stoltz et al. | 705/14 |
| 2004/0209677 A1* | 10/2004 | Park et al. | 463/29 |
| 2007/0093299 A1* | 4/2007 | Bergeron et al. | 463/43 |
| 2009/0042633 A1* | 2/2009 | Yacenda | 463/17 |
| 2009/0119171 A1* | 5/2009 | Goff et al. | 705/14 |
| 2009/0176549 A1* | 7/2009 | Saig et al. | 463/17 |
| 2009/0258691 A1* | 10/2009 | Jagannatha et al. | 463/17 |
| 2010/0069136 A1* | 3/2010 | Safaei et al. | 463/17 |
| 2010/0241504 A1* | 9/2010 | Bolt | 705/14.33 |
| 2011/0207525 A1* | 8/2011 | Allen et al. | 463/25 |
| 2012/0202587 A1* | 8/2012 | Allen et al. | 463/25 |

FOREIGN PATENT DOCUMENTS

| WO | WO 02/054355 A1 | 7/2002 |
|---|---|---|
| WO | WO 2007/049283 A2 | 5/2007 |

* cited by examiner

*Primary Examiner* — Damon Pierce
*Assistant Examiner* — Anh Vo V Nguyen
(74) *Attorney, Agent, or Firm* — Knobbe, Martens, Olson & Bear, LLP (57) ABSTRACT

The invention relates to a system and methods of conducting a lottery, the system comprising a gaming server in communication with a wireless communication device associated with a wireless network, wherein the gaming server in response to receiving a request from a lottery subscriber, generates chance units by debiting an amount from a billing system associated with the wireless network, quantifies the debited amount into chance units and credits the chance units into a chance unit account. The chance units are used thereof by the lottery subscriber to submit entries in lotteries. The invention further provides for methods of registering lottery subscribers, submitting entries in lotteries and performing a lottery draw.

12 Claims, 5 Drawing Sheets

LOTTERY SYSTEM AND METHODS THEREOF

CROSS-REFERENCE TO RELATED APPLICATION

Any and all priority claims identified in the Application Data Sheet, or any correction thereto, are hereby incorporated by reference under 37 CFR 1.57.

FIELD OF THE INVENTION

This invention relates generally to a lottery system and methods of operating the lottery system by wireless communication. More particularly the invention relates to a system for quantifying virtual money into chance units that can be used by subscribers of the lottery to participate in different types of lotteries or games of chance.

BACKGROUND OF THE INVENTION

The lottery industry or the gaming sector in general operates under the control of gaming institutions; with lottery players having minimal or no say in as far as the probability of a win is concerned. Further, traditional methods of betting such as Casino Gaming, sports events and playing lottery games are increasingly being augmented with electronic forms of betting, most notably using the internet, where, casino services and betting services are already generating substantial revenues. Players in casino style games, for instance, are only able to use play chips/money, to play only within their respective games. The money/chips have no value outside the specific games associated with them. Therefore, a player has no alternative use for any extra play money or chips remaining once he is through with playing-apart from changing back into chips or hard cash.

SUMMARY OF THE INVENTION

The first objective of the invention is to confer onto the players considerable latitude in how they participate in lotteries by quantifying a versatile unit of play known as a chance unit. This will allow a lottery subscriber to decide how many chance units to purchase and how to purchase them; when and how to expend the chance units; and even allows players to trade chance units with one another or with a group of players as well as earn bonus chance units. The invention further allows a group of players to come together and pool their collective chance units, to enhance their probability of winning.

The virtual nature of chance units makes them versatile and enables them to assume many other roles exclusively within and outside the realm of games of chance. Chance units in accordance with the present invention may act as an intermediary to facilitate the exchange from one form of virtual currency into another.

Chance units can also be utilized variously in games of chance as virtual tokens. Such games include lotteries, casino style games, and sports betting which encompasses placing bets in events. Chance units may also be used as a medium of exchange in which role they may facilitate the transfer of virtual currencies across wireless network providers and be stored in the gaming server to earn interest in the form of bonus chance units.

The above objectives and many others will become apparent from the various embodiments of the present invention.

In one embodiment of the invention there is provided a lottery system comprising a gaming server in communication with a wireless communication device where the gaming server includes a lottery registration module, a lottery database comprising at least one lottery, a lottery draw module and a chance units account linked to the gaming server to deposit therein chance units for use by a lottery subscriber to participate in at least one lottery. In response to receiving a request from the wireless communication device, the gaming server generates chance units by debiting an amount from a billing system associated with a wireless network. The gaming server quantifies the debited amount into chance units and credits the chance units into the chance units account. The chance units are thereafter used in the lottery system as a unit of play for various types of lotteries.

In another embodiment, the lottery system provides a system and method of registering subscribers with the lottery system in which mobile phone users are able to subscribe to the system and participate in lotteries by submitting entries in various lotteries or games of chance, which hitherto would have required use of different types of tokens or play money to participate. The gaming server includes a number of components that manage various aspects of the lottery system. A registration module manages registration of lottery subscribers to the lottery system. The lottery database is a depository of lotteries that can be accessed by subscribers and comprises at least one lottery that can be played by lottery subscribers. The lottery database contains a variety of lotteries from which lottery subscribers can select and participate in at least one lottery. The subscriber may select a particular lottery through a lottery menu in the wireless device or through the lottery website. A lottery draw module manages draws relating to selection of lottery winners. The gaming server comprises or is linked to a chance units account.

In another embodiment there is provided a registration method in which an individual wireless communication device user registers to use a lottery system of the invention. A lottery registration module manages registration of subscribers to the lottery system, in which a wireless communication device user may be invited by the gaming server to subscribe to the lottery system. The gaming server is configured to monitor a billing system of the wireless network and upon which the gaming server receives confirmation of topping up of a subscriber's airtime account with the wireless network. The gaming server thus periodically receives communication from the wireless network whenever a user's account with the wireless network is updated. The gaming server will then send an invitation to the user to subscribe to the lottery system. The system also provides for registration of lottery groups in that lottery subscribers can form lottery groups that may enable subscribers to earn bonus chance units and generally enhance chances of each group member to win in a lottery.

In another embodiment, the invention provides a method of generating chance units enabling subscribers to purchase chance units, which are then credited into the subscriber's chance units account and thereafter used to submit entries in different lotteries. The method entails a subscriber sending a request to the gaming server for generation of a specified number of chance units. The subscriber's request is sent using the lottery menu of the wireless communication device. The gaming server debits an amount equivalent to the requested number of chance units from a designated account. The gaming server then quantifies the debited amount into chance units which are then credited to the subscriber's chance units account.

In yet another embodiment, the invention further provides a method by which lottery subscribers can submit entries in lotteries through the lottery system. In one aspect, the lottery subscriber sends a request to the gaming server, the request comprising identification of a particular lottery for which the subscriber wants to submit entries and an indication of the number of entries to be submitted in that lottery. The gaming server evaluates the number of chance units commensurate with the requested number of entries and debits the chance units from the subscriber's chance units account. The gaming server then submits the requested number of entries in the lottery. In an alternative embodiment of submitting entries in a lottery, the subscriber may further submit entries by registering for periodic entries in a lottery—a so-called automatic method of submitting entries in a lottery. The method enables the subscriber to request the gaming server to submit periodic entries at a desired period. The desired period may include a time period, or upon subscriber topping-up their mobile phone airtime, or at the occurrence of specific events.

In a further embodiment, the invention provides for a method of performing a lottery draw and notifying the subscribers of the outcome. The method entails the lottery draw module selecting winning entries according to the lottery draw rules. The gaming server then sends messages to the winners notifying them of the results of the lottery.

The term "lottery" or "game of chance" as used herein includes lotteries and games of chance such as casino type games, slot machines, card games, horseracing, poker, betting on sports events, gambling, raffles, sweepstakes, and similar games of chance. The terms "Playing," "submitting entries", "making an entry" or "participating" in a lottery shall be given the relevant meaning in accordance with the convention of each game of chance or lottery as the circumstances dictates. For example the term "submitting entries," when used with reference to a betting game means placing bets in the game. Likewise "submitting entries" or "participating" in casino type games means using chance units as play money or chips in the game.

The term "user" as herein used refers to a cellular telephone owner who has, where necessary subscribed, to a wireless network system. Whereas the term a "subscriber" or "lottery subscriber" refers to a cellular mobile owner who has registered in or subscribed to the lottery system of the present invention. The term "subscriber" may also refer to a group of people who have been recruited to register individually and in addition teamed up to register as a lottery group in the lottery system in accordance with another embodiment of the present invention.

A wireless communication device as used herein includes a cellular telephone, a mobile telephone or similar devices capable of communicating in a wireless network.

DETAILED DESCRIPTION OF PREFERRED EMBODIMENTS

Figure 1:
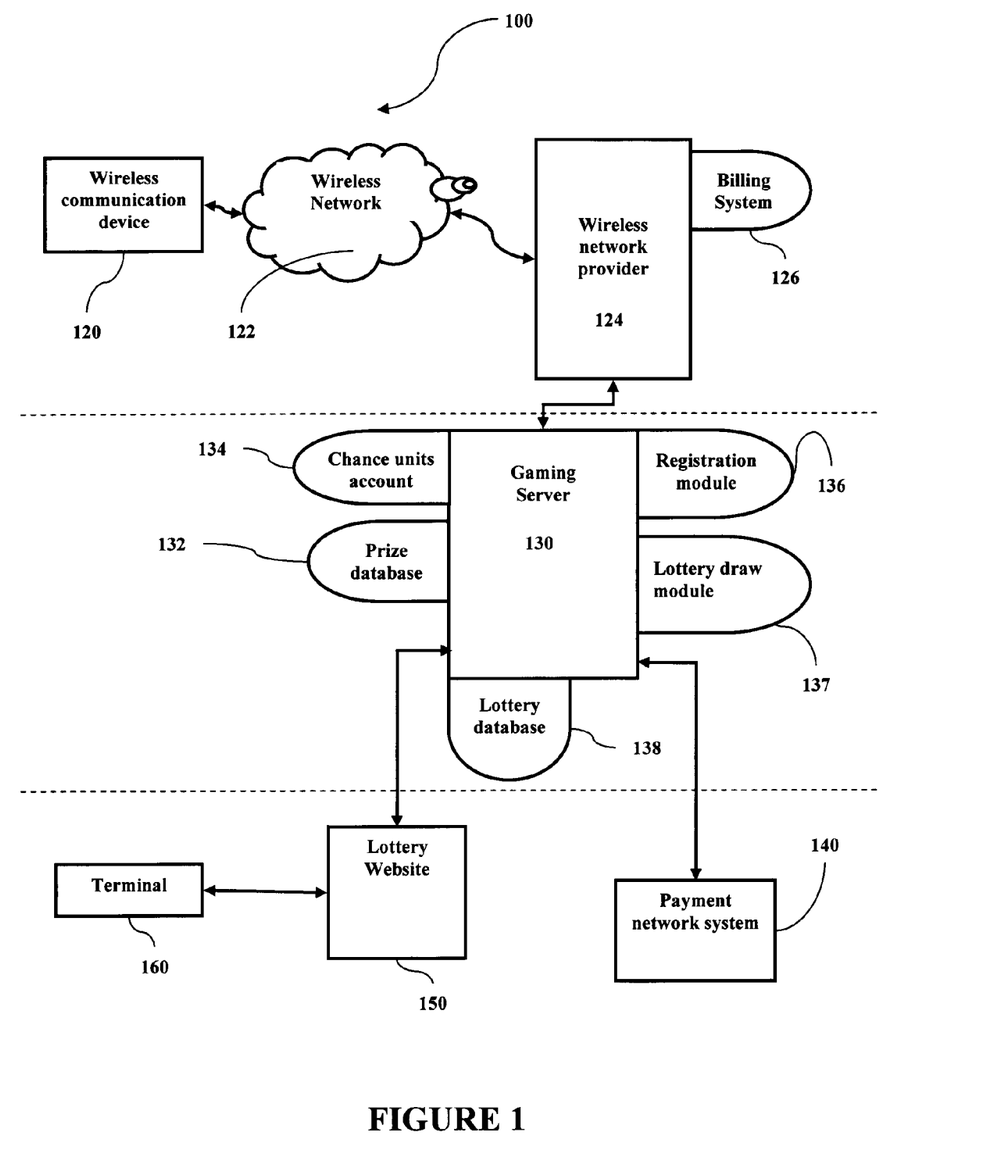
FIG. 1 is a schematic illustration of a preferred embodiment of a lottery system according to the invention.

Referring now to the drawings, FIG. 1 shows a schematic illustration of a preferred embodiment of a lottery system (100) according to the invention. In this preferred embodiment of the invention there is provided a lottery system (100) including a wireless communication device (120) and a billing system (126) associated with a wireless network (122) operated by a wireless network provider (124); a gaming server (130) which includes a lottery registration module (136), a lottery database (138), a lottery draw module (137), and a chance units account (134). The lottery system may further include a payment network system (140), a prize database (132), and a lottery website (150) that is accessible over the internet, for example from a computer (160). Whereas only one wireless network is illustrated, it will be appreciated that the lottery system can use more than one wireless network A wireless communication device owner uses the wireless communication device (120) to register in the lottery system (100) over the wireless network (122). Registration in the lottery system (100) through the registration module (136) enables the registered subscriber to participate in various lotteries offered by or through the lottery system (100). The wireless network (122) and the billing system (126) are operated by a wireless network provider (124). The billing system (126) associated with the network provider (130) manages billing and payments in relation to the usage of the wireless communication device, for both prepaid and post paid accounts of wireless network users. The billing system (126) manages individual user's accounts with respect to the user's usage of the wireless communication device.

In the present invention, the gaming server (130) and the associated databases and modules may either be operated by an independent entity or hosted by a wireless network provider. As will become apparent from the various embodiments of the invention, preferably the gaming server (130) is operated by an independent entity. This arrangement in essence allows users domiciled in different countries and from across different Wireless Network Providers to register and use the lottery system (100). Thus, the lottery system (100) of the present invention may not be restricted to one country; rather it allows participation of subscribers from different countries. It also allows participation of many wireless network providers who collaborate with the lottery operator.

The gaming server (130) communicates with the wireless communication device (120) through the wireless network (122). The gaming server (130) includes a number of components that manage various aspects of the lottery system (100). A registration module (136) manages registration of lottery subscribers to the lottery system (100). The lottery database (138) is a depository of lotteries that can be accessed by subscribers and comprises at least one lottery that can be played by lottery subscribers. The lottery database (138) contains a variety of lotteries from which lottery subscribers can select and participate in at least one lottery. A subscriber may select a particular lottery through the lottery menu in the wireless device or through the lottery website. A lottery draw module (137) manages draws relating to selection of lottery winners. The gaming server (130) comprises or is linked to a chance units account (134).

The chance units account (134) serves as a reservoir of chance units. Chance units are convertible units to be used by lottery subscribers to participate in different types of lotteries and games of chance. Chance units can be visualised as versatile units that can be used as virtual tokens, virtual play money, or chips. Because of their versatility, they can also be used in place of play money, tokens, or chips in casino style games and they can be converted into money whenever needed. Upon subscription to the lottery system (100), each lottery subscriber will have an individual chance units account created and managed by the gaming server (130). The lottery system (100) will have an exchange rate in various currency denominations for the chance units and once chance units have been purchased, they can therefore be converted into any currency. Chance units also act as an intermediary to facilitate the exchange from one form of virtual currency into another virtual currency without resort to real money. This is especially true in the case of virtual money offered by different wireless network providers where such monies are not directly inter-convertible. The gaming server (130) is also configured to reconvert chance units into virtual money that can be redeemed in cash in designated outlets. Lottery subscribers can also transfer or trade chance units with one another. A subscriber may use his own chance units to submit entries on behalf of another subscriber, in which case any prizes subsequently won would be deemed as belonging to the other subscriber, as if the other subscriber were the one who had submitted the entries.

The lottery system (100) may further comprise a prize database for recording of various prizes on offer in the lottery wherein the gaming server (130) updates the prize database upon a lottery subscriber redeeming a prize that has been won. This is relevant where the lottery is for example a raffle that may be offered by the lottery operator in collaboration with sponsoring agencies. The prize database is then made accessible to such sponsoring agencies for purposes of viewing and monitoring transactions details relating to redeeming of the prizes, more in relation to replenishing the prizes. As the lottery system enables participants from different countries to participate in the lottery, prizes may accordingly be grouped and awarded country wise, region wise, continent wise and international. This means that the lottery system may enable some sort of mini jackpots where prizes are grouped according to participants' countries.

In another embodiment of the invention, in response to a request from a subscriber through the wireless communication device, the gaming server (130) generates chance units by debiting an amount from the subscriber's account in the billing system (126) of the wireless network (122). The debited amount is quantified into chance units, which are then credited to the subscriber's chance units account (134). In an alternative embodiment, the gaming server (130) may generate chance units by debiting an amount from a payment network system (140) which is in communication with the gaming server (130). In this case, the payment network system is in communication with the subscriber's other accounts. Such other accounts include a banking system account operatively in communication with the wireless network provider, a money transfer system account, a credit card system, top up scratch cards for the cellular telephone and internet based money transfer systems. The subscriber's request to the gaming server (130) for generation of chance units will specify the number of chance units to be generated, and depending on the exchange rate, the gaming server (130) will debit the equivalent amount from the subscriber's account and credit the commensurate number of chance units into the subscriber's chance units account (134). The chance units can then be used to submit entries in the lottery.

Registration Method

Figure 2:
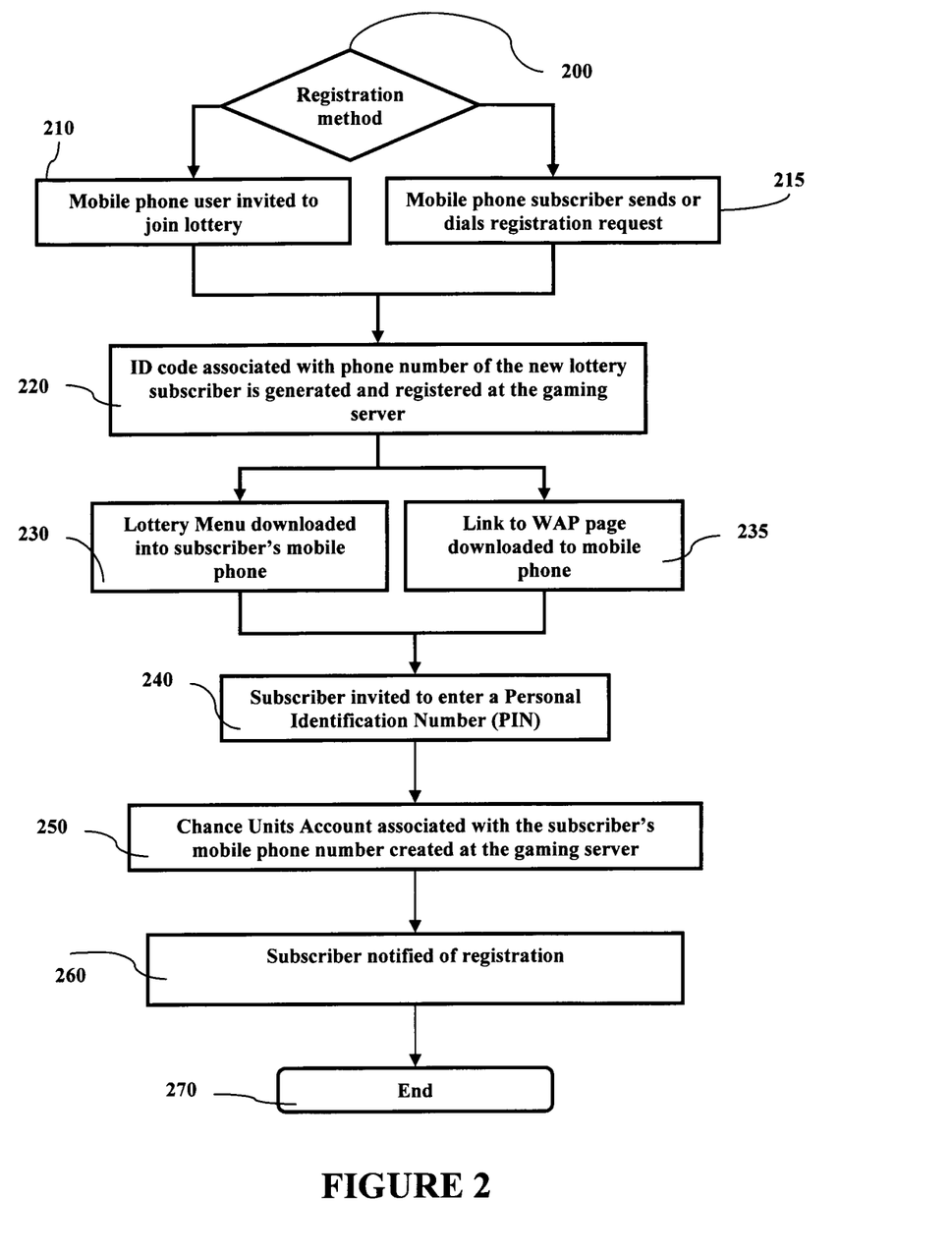
FIG. 2 is a flow chart illustrating a registration method according to a preferred embodiment of the invention.

FIG. 2 is a flow chart that illustrates the registration method in which an individual wireless communication device user registers in the lottery system (100) of the invention. The lottery registration module (136) manages registration into the lottery system. In one aspect, a wireless communication device user may be invited by the gaming server (130) to subscribe to the lottery system (100). The gaming server (130) is configured to monitor the billing system (126) of the wireless network (122), and therefore the gaming server (130) receives confirmation of topping up of a subscriber's airtime account with the wireless network (122). The gaming server (130) thus periodically receives communication from the wireless network (122) whenever a user's account with the wireless network (122), either prepaid or post paid, is updated either by topping up in case of prepaid account or payment of a bill in case of a post paid account. The gaming server (130) will then send an invitation to the user to subscribe to the lottery system (100). In a non-limiting example, the invitation to the user may be in the form of an SMS message. In another aspect, the lottery operator may also publicise the lottery, and specify the registration procedure. For example, potential subscribers may be required to send the registration request to a short code prefix (for example 1234) that is usable across all collaborating wireless networks. A user upon agreeing to subscribe to the lottery will then send a registration request through the wireless network (122) to the gaming server (130). Alternatively, the user may also be required to dial the short code prefix on the wireless device. Upon receiving the registration request, the gaming server (130) will generate and record an identity (ID) code associated with user's mobile phone number. The ID code for example may even be the same as mobile phone number itself. The gaming server (130) will then activate a lottery interface to the subscriber's device by sending or downloading a lottery menu to the subscriber's device. The lottery menu becomes the subscriber interface for communicating with the gaming server (130). Alternatively, the subscriber may receive a link to a wireless application protocol (WAP) page referring to a corresponding lottery website where the subscriber can also access the lottery system (100). For security reasons the subscriber may be required to provide a personal identification number (PIN) for logging into the lottery system (100).

The gaming server (130) creates a chance units account (134) associated with the subscriber's mobile phone number. Upon successful registration of a subscriber, the gaming server (130) may be configured to send a notification to the subscriber through the wireless network (122) on the status of the registration to the lottery system (100). For example, the notification may include the subscriber's PIN and statement of the chance units account (134). Registration in the lottery system (100) and the quantification of chance units enables participation by players from various network providers including players subscribing to wireless networks from other countries.

Registration of Lottery Groups

Figure 3:
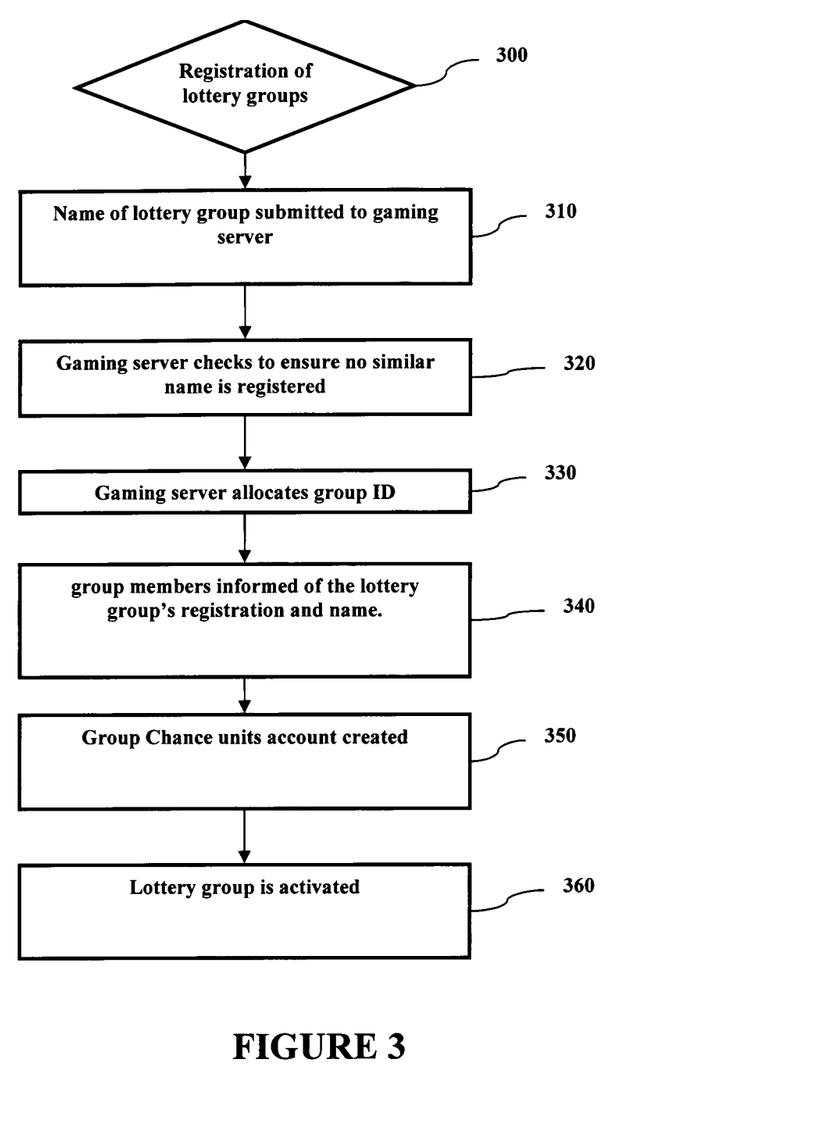
FIG. 3 is a flow chart illustrating a method for group registration according to a further embodiment of the invention.

FIG. 3 illustrates a further embodiment of the invention relating to registration of lottery groups where a lottery subscriber can recruit friends into the lottery system to form a lottery group. Lottery groups can participate in the lottery in a manner similar to the individual subscribers. Lottery groups will also assist the subscribers to earn bonus chance units and in the process enhance their individual chances of winning prizes by operating as a group in the lottery. The formation and operations of lottery groups will be enabled and facilitated through links between the lottery menu and the lottery website, the gaming server (130) and wireless network providers. A lottery subscriber may join a lottery group of his choice from the lottery website or through the mobile phone. A lottery subscriber in a lottery group may also actively solicit for potential lottery friends using the lottery website or the lottery menu in his mobile phone that enable him to place requests for and recruit new lottery friends. The prizes won by a lottery group will be distributed only amongst the lottery group members existing in the lottery group at the time of winning the prizes. Lottery group subscribers who were members of the lottery group but deregistered from it prior to the prize being won are not eligible for a share of the prize. The prize won by a lottery group will be divided amongst the lottery group members depending upon the number of entries each lottery group member has submitted in a lottery.

Referring to FIG. 3 the method of registration (300) of lottery groups involves the steps of a lottery subscriber submitting a request (310) to the gaming server, the request comprising the proposed name of the lottery. The gaming server will then check (320) to ensure that no similar group name is registered in the gaming server. The gaming server will then allocate (330) a group reference number, which reference number will be used as an ID for the lottery group and is used to identify the entries submitted by it in the lottery. Similarly, every lottery group is provided with a reference number upon registration. The gaming server will generate (340) and send a notification message to each member of the group to inform them of the lottery group's registration name. The gaming server will create (350) a chance units account for the group. The lottery group is then activated (360) when members credit chance units into the group's chance units account. Every group member will then be required to credit chance units in the group account according to the lottery's rules governing lottery groups. The members can also participate in the lottery in turns, meaning that every group member will be required to submit entries in the lottery.

Method of Generating Chance Units.

Figure 4:
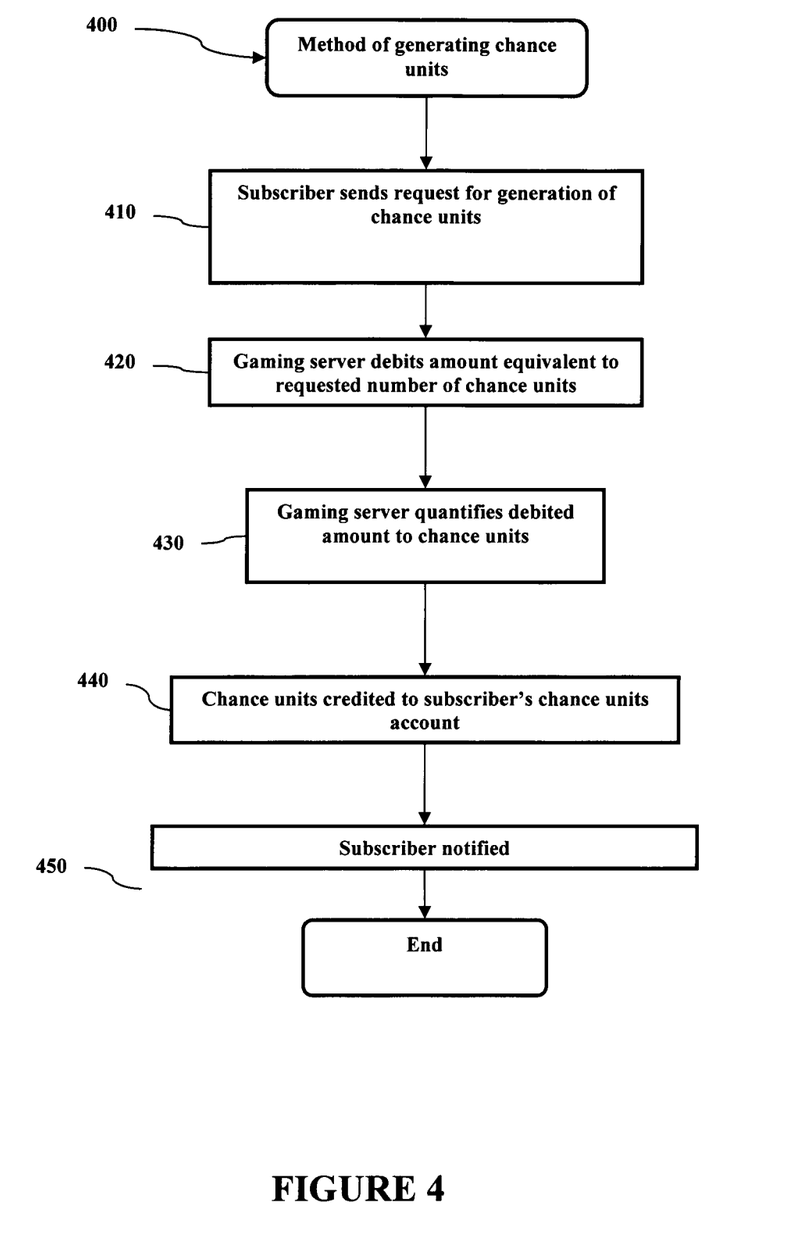
FIG. 4 is a flow chart illustrating a method for generation of chance units in accordance with a preferred embodiment of the invention.

FIG. 4 illustrates the flow chart of a method (400) of generating chance units. The method comprises a subscriber sending (410) a request to the gaming server for generation of a specified number of chance units. The subscriber's request is sent using the lottery menu of the wireless communication device. The subscriber may also use the lottery website to submit the request. The request will designate the account from which the gaming server will debit the amount necessary to generate the chance units. Upon receiving the request for generation of a designated number of chance units, the gaming server will debit (420) an amount equivalent to the requested number of chance units from the designated account. The gaming server then quantifies (430) the debited amount into chance units and credits (440) the chance units into the subscriber's chance units account. The subscriber may then be informed (450), for example through an SMS to the wireless communication device of the generation of chance units and the total number of chance units in the account. In a manner similar to the method of registering users to the lottery, the gaming server may be configured to detect activities in the wireless network (122) whenever the subscriber tops up or pays a bill relating to the wireless communication device account. Upon detecting such an activity, the gaming server sends a message to the subscriber asking whether the subscriber would want to generate chance units. If the subscriber's response is positive, the subscriber will then be required to follow the method of generating chance units described above.

In an alternative embodiment of generating chance units, the subscriber may submit a request to the gaming server for periodic generation of chance units. This method is similar to the method described below in relation to making manual lottery entries. The subscriber will register with the gaming server for chance units to be generated periodically at a desired period. The desired period may include a time period, or upon subscriber topping-up their mobile phone airtime, or at the occurrence of specific events. The gaming server via the lottery menu or the lottery website will provide the available options. Upon the subscriber submitting their selection of the available options, the gaming server will register the request, after which the gaming server will be automatically generating chance units at the desired period. The periodic generation of chance units is premised on availability of sufficient finds in the subscriber's designated account.

In a further embodiment, the gaming server is configured to generate free extra chance units as bonuses to be credited to eligible subscriber's chance units account. Eligible subscribers may be selected as a result of coincidences of certain events from within and outside the subscriber's wireless network provider. For example, a subscriber may earn extra chance units if the time at which he expends his chance units coincides with that of another lottery subscriber terminating a phone call or SMS to a third lottery subscriber. Bonus chance units may also be earned by subscribers participating in lottery groups.

Figure 5:
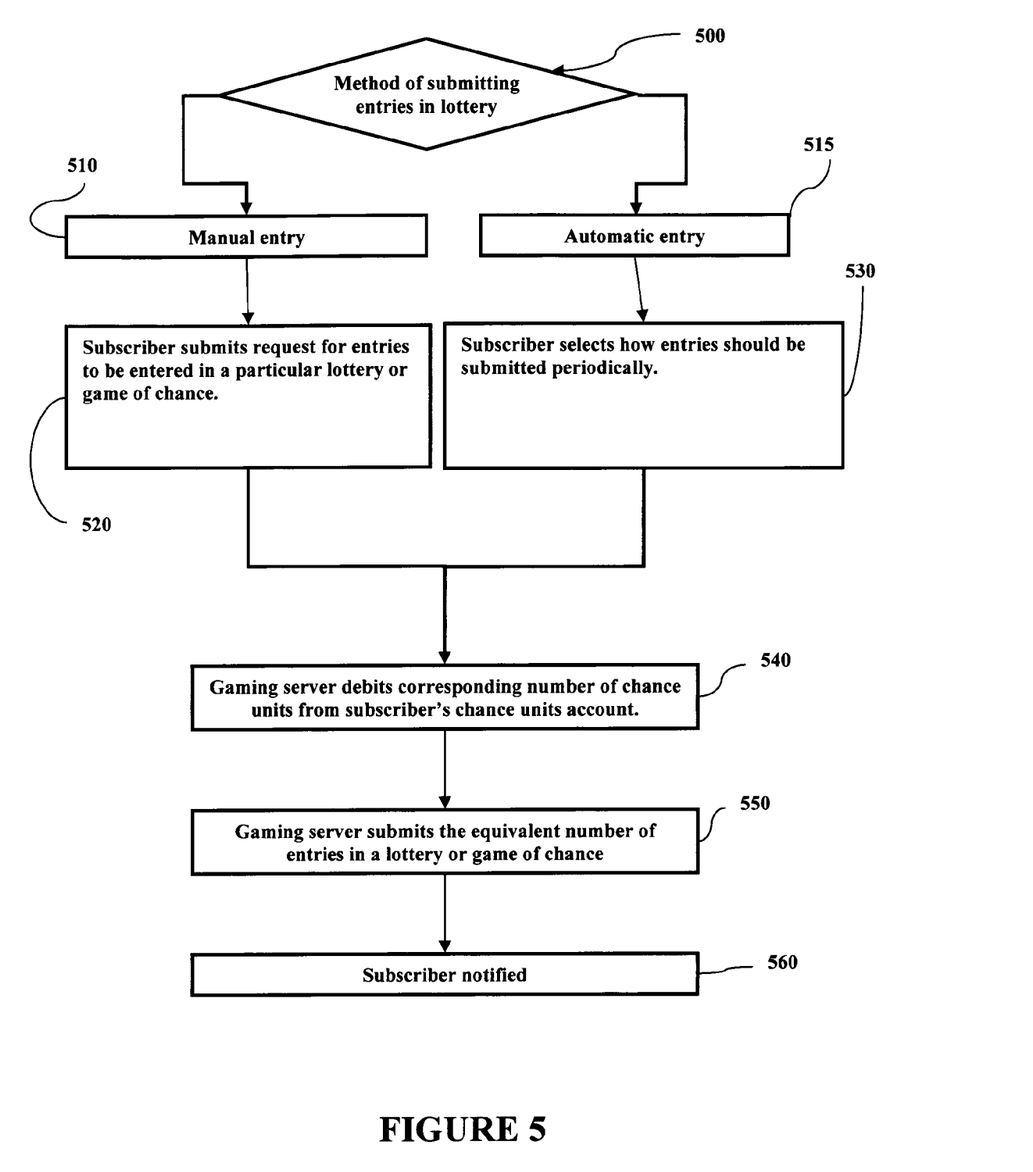
FIG. 5 is a flow chart of a method of submitting entries in a lottery in accordance with a preferred embodiment of the invention.

Method of Submitting Entries in a Lottery FIG. 5 illustrates the flow chart of a method (500) of a lottery subscriber participating in a lottery by submitting entries through the lottery system. In one aspect, the method of submitting entries in a lottery comprises the following steps—so called manual method (510) of submitting entries. From the lottery menu of the wireless communication device the lottery subscriber sends (520) a request to the gaming server, the request comprising identification of the lottery and an indication of the number of entries to be submitted in the lottery. The gaming server will evaluate (540) the number of chance units commensurate with the requested number of entries and debit the chance units from the subscriber's chance units account. The gaming server will then submit (550) the requested number of entries in the lottery. The gaming server will then send (560) a confirmation message to the wireless communication device of the subscriber, in which the confirmation message comprising information that identifies the lottery that has been entered, the number of entries submitted and the subscriber's balance in the chance units account.

In an alternative embodiment of submitting entries in a lottery the subscriber may further submit entries by registering for periodic entries in a lottery—so called automatic method (515) of submitting entries in a lottery. The method is similar to the method described above in relation to making manual entries except that in this case the subscriber through the lottery menu or the lottery website opts to submit periodic entries (530) in a particular lottery. The method includes the steps of the subscriber sending a request to the gaming server for entries to be submitted at a desired period. The desired period for making periodic entries may include a time period, or upon subscriber topping-up their mobile phone airtime, or at the occurrence of specific events. The available options will be provided by the gaming server via the lottery menu or the lottery website. Upon the subscriber submitting their selection of the available options the gaming server will register the request, after which the gaming server will automatically be submitting entries at the desired period. The submission of automatic entries in a lottery is premised on availability of sufficient chance units in the subscriber's chance units account (134).

Method of Performing a Lottery Draw and Notifying Subscribers

In a further embodiment, the invention relates to a method of performing a lottery draw and notifying the subscribers of the outcome. The method includes the steps of the lottery draw module selecting winning entries according to the lottery draw rules. The gaming server then sends messages to the winners notifying them of the results of the lottery. The method further includes the step of paying prizes to the winners in which the payable prizes may be paid by crediting the prize into the subscriber's chance units account in the lottery system or into the subscriber's account maintained by the payment network system or into the subscriber's account maintained by the billing system (126) of the wireless network (122). In case of raffles, in which the prizes are goods rather than money, the winners may redeem their prizes in outlets as may be designated by the lottery operator.

As described above, the lottery system may also be configured to enable participants from different countries to participate in the lottery, and prizes may accordingly be grouped and awarded country wise, region wise, continent wise and international. This means that the lottery system will enable some sort of mini jackpots, where prizes are grouped according to the participant's country. The prizes could also be awarded regional wise, continental wise and internationally. Further, the lottery draw may be conducted in real time and instant prizes also awarded in real time, of which they will be redeemable instantly. Prizes may be paid in cash or in kind, including free airtime and chance units.

Variations

Various alternatives, modifications, and variations are encompassed in the spirit and scope of the invention in accordance with the following non-limiting examples.

The Gaming Server as a Chance Units Virtual Bank and Clearing House:

The gaming server may be configured to allow a subscriber or lottery group to open a second chance units account for depositing chance units that may not be of immediate need. In return, such a subscriber would periodically earn free bonus chance units that would be credited into the same account. The Chance units in this interest earning account may be used as security whenever the subscriber may require to borrow chance units to cover for shortfalls in the course of his play. Borrowing of chance units may be considered similar to borrowing chips or play money in casino games. The chance units may also be used for hedging, as is common in lotteries.

Advertisement

The lottery system may be configured to allow adverts to be sent to lottery subscribers. For example, a particular message targeted at a lottery group may be received by each lottery group member in such a manner as to have the message received by each lottery group member being associated with an advert of a different brand or corporate. Messages sent to two lottery subscribers in separate countries may be accompanied by two different adverts each relevant to either country.

Subscriber Reward

A subscriber reward system may be introduced to reward subscribers for expending their chance units, for example beyond a predetermined threshold within a defined time. the rewards may be in kind, mainly in the form of bonus chance units credited into the chance units accounts of such subscribers on a graduated scale with those expending more chance units beyond the threshold getting a higher bonus. Alternatively, this group of subscribers may also automatically become eligible to enter a mini-jackpot. These examples are indicative and do not in any way exhaust the various methods that can be used to design a subscriber reward system.

It will be appreciated that many other alternatives, modifications, and variations will be apparent to those skilled in the art. Accordingly, the invention is intended to embrace all such alternatives, modifications, and variations without departing from the scope or spirit thereof.

The invention claimed is:

1. A lottery system comprising:
a gaming server in communication with a wireless communication device of a subscriber, a billing system, and a chance units account,
wherein the billing system is associated with the network provider which manages billing and payments in relation to the usage of the wireless communication device;
wherein the gaming server is configured with server-executable instructions to perform operations comprising:
in response to receiving a registration request from the wireless communication device:
downloading and activating a user interface on the wireless communication device,
receiving, from the user interface of the wireless communication device, a request for a number of chance units,
generating the number of chance units by debiting an amount from the billing system,
quantifying the debited amount into chance units, and
crediting the number of chance units into the chance units account;
wherein subscribers to the lottery system can transfer or trade chance units with one another, and
wherein:
the registration request comprises a designated code,
the registration request is sent in response to the wireless communication device user receiving an invitation to subscribe to the lottery,
the invitation to subscribe to the lottery is sent in response to the wireless communication device user topping UP airtime or paying a bill in relation to usage of the wireless communication device; and
the gaming server is configured with server-executable instructions to perform operations further comprising:
generating and recording an identification code associated with the user's telephone number;
activating a lottery interface; and
creating a chance units account associated with the subscriber's mobile phone number.

2. The system of claim 1 wherein the gaming server is configured with server-executable instructions to perform operations further comprising reconverting chance units into virtual money that can be redeemed in designated outlets.

3. The system of claim 1 wherein the system is further configured to register lottery groups where the subscriber recruits friends into the lottery to establish a lottery group.

4. The system of claim 1 wherein:
the request for the number of chance units comprises a request for periodic generation of chance units based on: a time period, or upon the subscriber topping-up or crediting their wireless communication device airtime, or at the occurrence of specific events;
the gaming server is configured with server-executable instructions to perform operations further comprising debiting an amount equivalent to the number of chance units from a designated account; and
the chance units account is associated with the subscriber.

5. A method of conducting a lottery, comprising:
receiving, at a gaming server, a registration request from a wireless communication device associated with a subscriber;
wherein the registration request is sent in response to receiving an invitation to subscriber to the lottery from the gaming server, wherein the invitation to subscribe to the lottery is sent in response to a user topping UP or paying a bill relating to the wireless communication device account;
upon receipt of the request, generating and recording, by the gaming server, an identification code associated with the subscriber's telephone number;
creating a chance units account associated with the subscriber's wireless communication device at the gaming server;
in response to receiving the registration request from the wireless communication device, downloading and activating, by the gaming server, a user interface on the wireless communication device;
receiving, at the gaming server, a request for a number of chance units from the user interface of the wireless communication device;
generating, at the gaming server, the number of chance units by debiting an amount from a billing system, quantifying the debited amount into the number of chance units, and crediting the chance units into the chance units account, wherein the request for a number of chance units comprises a request for periodic generation of the number of chance units, wherein the request for periodic generation of the number of chance units indicates a desired period for generation of the number of chance units, and wherein the desired period for the periodic generation of the number of chance units includes: a time period, or upon the subscriber topping-up or crediting their mobile phone airtime, or at an occurrence of specific events;
receiving, at the gaming server, a lottery draw entry from the user interface of the wireless communication device;
performing a lottery draw and notifying the subscriber of the lottery draw by the gaming server; and
wherein the billing system is associated with the network provider which manages billing and payments in relation to the usage of the wireless communication device.

6. The method of claim 5, further comprising enabling registration of lottery groups wherein the subscriber recruits other people into the lottery to form a lottery group.

7. The method of claim 6 wherein a lottery subscriber may join a lottery group from a lottery website or from the wireless communication device.

8. The method of claim 5, further comprising:
sending the lottery draw entry to the gaming server via the wireless communication device, the lottery draw entry comprising identification of a lottery, an indication of a number of entries to be submitted thereof,
evaluating, at the gaming server, the number of chance units commensurate with the requested number of entries and debiting the chance units from the chance units account;
making, by the gaming server, the requested number of entries in the lottery;
sending, from the gaming server, a confirmation message to the wireless communication device, the confirmation message comprising information that identifies the lottery, the number of entries submitted and the subscriber's balance in the chance units account.

9. The method of claim 5 wherein the performing of a lottery draw and notifying the subscriber by the gaming server includes the steps of:
selecting winning entries according to the lottery draw rules;
sending messages to all winners notifying them of their win; and
paying prizes to the winners, wherein the prizes are grouped and awarded country wise, region wise, continent wise, or international.

10. The method of claim 5 further comprising generating, at the gaming server, free extra chance units as bonuses to be credited to eligible subscribers' chance units accounts.

11. The method of claim 10 wherein the eligible subscribers may be selected as a result of coincidences of certain events from within and outside the subscriber's wireless network.

12. The method of claim 10, further comprising:
sending a request, from the wireless communication device to the gaming server, for entries to be submitted at a desired period;
registering the request at the gaming server; and
automatically submitting entries at the desired period by the gaming server,
wherein the desired period for making periodic entries includes: a time period, or upon the subscriber topping-up or crediting their wireless communication device airtime, or at the occurrence of specific events.

* * * * *